(12) United States Patent
Hudgens et al.

(10) Patent No.: US 10,328,366 B2
(45) Date of Patent: Jun. 25, 2019

(54) FLUID RESERVOIR HAVING INLET FILTERING

(71) Applicant: Caterpillar Inc., Peoria, IL (US)

(72) Inventors: Jason W. Hudgens, Washington, IL (US); Theron J. Cassidy, Peoria, IL (US); Dave T. Ahlman, Bothell, WA (US); Shawn R. Herold, East Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 518 days.

(21) Appl. No.: 15/003,835

(22) Filed: Jan. 22, 2016

(65) Prior Publication Data

US 2016/0339370 A1    Nov. 24, 2016

Related U.S. Application Data

(60) Provisional application No. 62/165,012, filed on May 21, 2015.

(51) Int. Cl.
| | | |
|---|---|---|
| B01D 29/27 | (2006.01) | |
| B01D 29/90 | (2006.01) | |
| B01D 53/90 | (2006.01) | |
| B01D 53/94 | (2006.01) | |
| B01D 35/027 | (2006.01) | |

(52) U.S. Cl.
CPC .......... *B01D 35/027* (2013.01); *B01D 29/27* (2013.01); *B01D 29/902* (2013.01); *B01D 35/0276* (2013.01); *B01D 53/90* (2013.01); *B01D 53/9418* (2013.01); *B01D 2251/208* (2013.01); *B01D 2251/2062* (2013.01); *B01D 2251/2067* (2013.01)

(58) Field of Classification Search
None
See application file for complete search history.

(56) References Cited

U.S. PATENT DOCUMENTS

| | | | | | |
|---|---|---|---|---|---|
| 1,055,744 | A | * | 3/1913 | Hans ................... | B01D 35/005 210/305 |
| 1,058,133 | A | * | 4/1913 | Yourtree ............. | B01D 36/001 210/313 |
| 1,072,371 | A | * | 9/1913 | Stone .................. | B60K 15/06 137/577 |
| 1,113,683 | A | * | 10/1914 | Pfahler ............... | B01D 36/001 210/172.2 |
| 1,155,070 | A | * | 9/1915 | Kessler ............... | B60K 15/04 137/588 |
| 1,177,277 | A | * | 3/1916 | Schaub ............... | B01D 35/027 210/172.6 |
| 1,191,741 | A | * | 7/1916 | Scull .................. | B01D 35/0273 184/6.24 |
| 1,192,134 | A | * | 7/1916 | Stevens .............. | G01F 23/58 137/588 |

(Continued)

*Primary Examiner* — Robert J Popovics
(74) *Attorney, Agent, or Firm* — Finnegan, Henderson, Farabow, Garrett & Dunner, LLP

(57) ABSTRACT

An inlet filter is disclosed for use with a reductant tank having a fill spout. The inlet filter may have a generally cylindrical base portion with an open top end and an open bottom end and configured for mounting inside the fill spout. The inlet filter may also have a mesh bag with a top connected to the generally cylindrical base portion, a folded bottom, and open side edges. The inlet filter may further have a bag carrier configured to close the open side edges.

18 Claims, 4 Drawing Sheets

(56) References Cited

U.S. PATENT DOCUMENTS

| | | | | |
|---|---|---|---|---|
| 1,217,732 A * | 2/1917 | Fedders | F28D 1/0358 | 123/41.27 |
| 1,394,011 A * | 10/1921 | Hills | B01D 35/02 | 210/172.4 |
| 1,415,217 A * | 5/1922 | Brock | B60K 15/04 | 210/172.6 |
| 1,436,294 A * | 11/1922 | Scott | B60K 15/0406 | 210/473 |
| 1,451,136 A * | 4/1923 | Allnutt | F01P 11/0214 | 137/526 |
| 1,553,395 A * | 9/1925 | Ressler | A62C 4/00 | 137/493.3 |
| 1,570,461 A * | 1/1926 | Cohn | A62C 4/00 | 220/88.2 |
| 1,581,947 A * | 4/1926 | Hobbs | B01D 35/023 | 210/451 |
| 1,596,362 A * | 8/1926 | McDonald | B01D 35/023 | 210/305 |
| 1,604,048 A * | 10/1926 | Hobbs | B01D 35/023 | 210/172.6 |
| RE16,994 E * | 6/1928 | Cohn | F16K 24/04 | 210/172.6 |
| 1,677,118 A * | 7/1928 | Ford | B01D 29/23 | 210/457 |
| 1,711,093 A * | 4/1929 | Helman | B01D 35/023 | 210/314 |
| 1,757,285 A * | 5/1930 | Anschicks | F16K 17/19 | 210/172.6 |
| 1,814,656 A * | 7/1931 | Anschicks | B65D 25/385 | 210/172.6 |
| 1,862,815 A * | 6/1932 | Buddenbrock | B60K 15/0403 | 220/86.2 |
| 1,953,669 A * | 4/1934 | Bettes | B67D 7/565 | 116/228 |
| 1,976,975 A * | 10/1934 | Williams | B60K 15/0403 | 210/172.6 |
| 2,010,445 A * | 8/1935 | Sparks | B60K 15/04 | 210/172.6 |
| 2,145,759 A * | 1/1939 | Fellows | B60K 15/0403 | 210/172.6 |
| 2,172,031 A * | 9/1939 | Norman | B01D 35/023 | 210/472 |
| 2,288,532 A * | 6/1942 | Knapp | B01D 17/10 | 210/244 |
| 2,351,526 A * | 6/1944 | Lebus | B60K 15/0406 | 210/172.6 |
| 2,379,735 A * | 7/1945 | Meikle | B60K 15/0406 | 210/172.6 |
| 2,466,076 A * | 4/1949 | Bentley | B60K 15/04 | 220/8 |
| 2,524,313 A * | 10/1950 | Gerling | B60K 15/04 | 116/228 |
| 2,647,636 A * | 8/1953 | Rafferty | B01D 35/023 | 210/238 |
| 2,733,775 A * | 2/1956 | Dupure | B01D 35/023 | 210/348 |
| 3,016,161 A * | 1/1962 | Peplin | B01D 35/023 | 141/382 |
| 3,322,282 A * | 5/1967 | Lyman | A47L 15/4206 | 134/110 |
| 3,456,799 A * | 7/1969 | Musial | B01D 35/023 | 210/437 |
| 3,905,505 A * | 9/1975 | Gallay | B60K 15/077 | 220/563 |
| 4,224,167 A * | 9/1980 | Buttigieg | B01D 35/023 | 137/592 |
| 4,259,184 A * | 3/1981 | D'Arnal | A61J 1/05 | 141/329 |
| 4,326,641 A * | 4/1982 | Wilken | B60K 15/0403 | 141/392 |
| 4,490,253 A * | 12/1984 | Tafara | B01D 29/111 | 210/238 |
| 4,545,833 A * | 10/1985 | Tafara | B01D 29/111 | 112/441 |
| 4,640,771 A * | 2/1987 | Whalen | B01D 29/15 | 210/167.01 |
| 4,860,805 A * | 8/1989 | Townsend | A47C 27/085 | 141/286 |
| 4,861,478 A * | 8/1989 | Hall | B01D 29/35 | 141/286 |
| 4,908,130 A * | 3/1990 | Lynne | B01D 29/90 | 210/172.6 |
| 5,025,946 A * | 6/1991 | Butkovich | B60K 15/0403 | 220/86.3 |
| 5,029,634 A * | 7/1991 | Hurner | B67D 7/80 | 123/142.5 R |
| 5,135,044 A * | 8/1992 | Hurner | B67D 7/80 | 123/557 |
| 5,202,021 A * | 4/1993 | Griffin | B01D 46/02 | 210/232 |
| 5,290,441 A * | 3/1994 | Griffin | B01D 46/06 | 210/232 |
| 5,308,485 A * | 5/1994 | Griffin | B01D 46/06 | 210/232 |
| 5,312,545 A * | 5/1994 | Starin | B01D 35/027 | 210/172.6 |
| 5,505,849 A * | 4/1996 | Rama, Jr. | B01D 29/27 | 210/232 |
| 5,520,802 A * | 5/1996 | Brubaker | B01D 29/35 | 210/172.6 |
| 5,582,729 A * | 12/1996 | Shioda | B01D 35/0273 | 210/172.4 |
| 6,279,751 B1 * | 8/2001 | Malkin | B01D 29/15 | 210/457 |
| 6,858,134 B2 * | 2/2005 | Yates | B01D 29/21 | 210/167.01 |
| D518,871 S * | 4/2006 | Gillette | D23/209 | |
| 7,429,322 B2 * | 9/2008 | Fujita | B01D 17/00 | 210/172.4 |
| 7,837,875 B2 * | 11/2010 | Callaert | B01D 29/15 | 210/232 |
| D637,698 S * | 5/2011 | Greene | D23/268 | |
| 8,029,667 B2 * | 10/2011 | Santinon | B60K 15/04 | 210/172.6 |
| 8,137,546 B2 * | 3/2012 | Ogose | B01D 35/0273 | 210/172.4 |
| 8,173,013 B2 * | 5/2012 | Sato | B01D 35/0273 | 210/172.4 |
| 8,372,278 B1 * | 2/2013 | Nguyen | B01D 35/0273 | 123/196 A |
| 8,459,013 B2 * | 6/2013 | Hosaka | F01N 3/2066 | 60/295 |
| 8,586,895 B2 * | 11/2013 | Haeberer | F01N 3/2066 | 219/209 |
| 8,967,181 B2 * | 3/2015 | Wetzel | B60K 15/03519 | 137/202 |
| 9,248,390 B2 * | 2/2016 | Hudgens | B01D 29/56 | |
| 9,427,684 B2 * | 8/2016 | Welch | B01D 35/005 | |
| 9,468,875 B2 * | 10/2016 | Cassidy | B01D 35/0276 | |
| 9,470,193 B2 * | 10/2016 | Ries | F02M 37/22 | |
| 9,486,725 B2 * | 11/2016 | Ries | B01D 35/0276 | |
| 9,803,530 B2 * | 10/2017 | Treudt | F01N 3/2066 | |
| 9,816,470 B2 * | 11/2017 | Nishio | F02M 37/10 | |
| 9,879,829 B2 * | 1/2018 | Delihas | B60K 15/03 | |
| 10,145,341 B2 * | 12/2018 | Kim | F02M 37/14 | |
| 10,190,554 B2 * | 1/2019 | Ishimitsu | F02M 37/30 | |
| 2005/0109685 A1 * | 5/2005 | Fujita | B01D 17/00 | 210/172.2 |
| 2011/0036763 A1 * | 2/2011 | Santinon | B60K 15/04 | 210/232 |
| 2011/0132825 A1 * | 6/2011 | Nishio | F02M 37/10 | 210/172.4 |
| 2012/0312759 A1 * | 12/2012 | Ries | F02M 37/22 | 210/806 |
| 2013/0092290 A1 * | 4/2013 | Waymire | B60K 15/0403 | 141/286 |
| 2014/0026990 A1 * | 1/2014 | Delihas | B60K 15/03 | 137/558 |

(56) References Cited

U.S. PATENT DOCUMENTS

| | | | |
|---|---|---|---|
| 2014/0230315 A1* | 8/2014 | Ries | B01D 35/005 44/300 |
| 2014/0231366 A1* | 8/2014 | Ries | B01D 35/0276 210/806 |
| 2014/0284286 A1* | 9/2014 | Ries | F02M 37/22 210/808 |
| 2015/0023843 A1* | 1/2015 | Driscoll | F01N 3/208 422/168 |
| 2015/0196862 A1* | 7/2015 | Cassidy | B01D 35/0276 55/372 |
| 2015/0198071 A1* | 7/2015 | Hudgens | B01D 29/56 210/805 |
| 2015/0218990 A1* | 8/2015 | Hudgens | F01N 3/2066 423/239.1 |
| 2015/0354425 A1* | 12/2015 | Hudgens | H05B 3/82 29/611 |
| 2016/0115919 A1* | 4/2016 | Nishio | F02M 37/10 210/416.4 |
| 2016/0339370 A1* | 11/2016 | Hudgens | B01D 35/027 |
| 2016/0376968 A1* | 12/2016 | Tan | F01N 3/2066 137/340 |
| 2017/0122170 A1* | 5/2017 | Fahrenkrug | B01D 29/114 |
| 2017/0189837 A1* | 7/2017 | Herold | B01D 35/0276 |

* cited by examiner

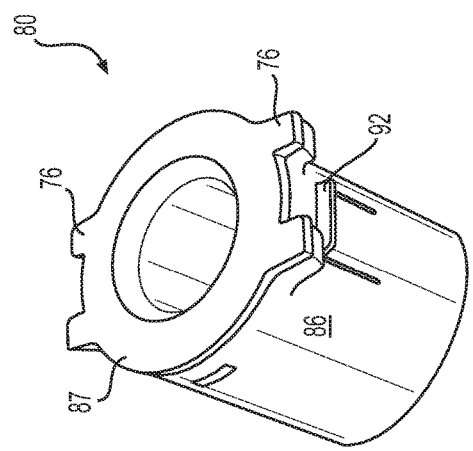
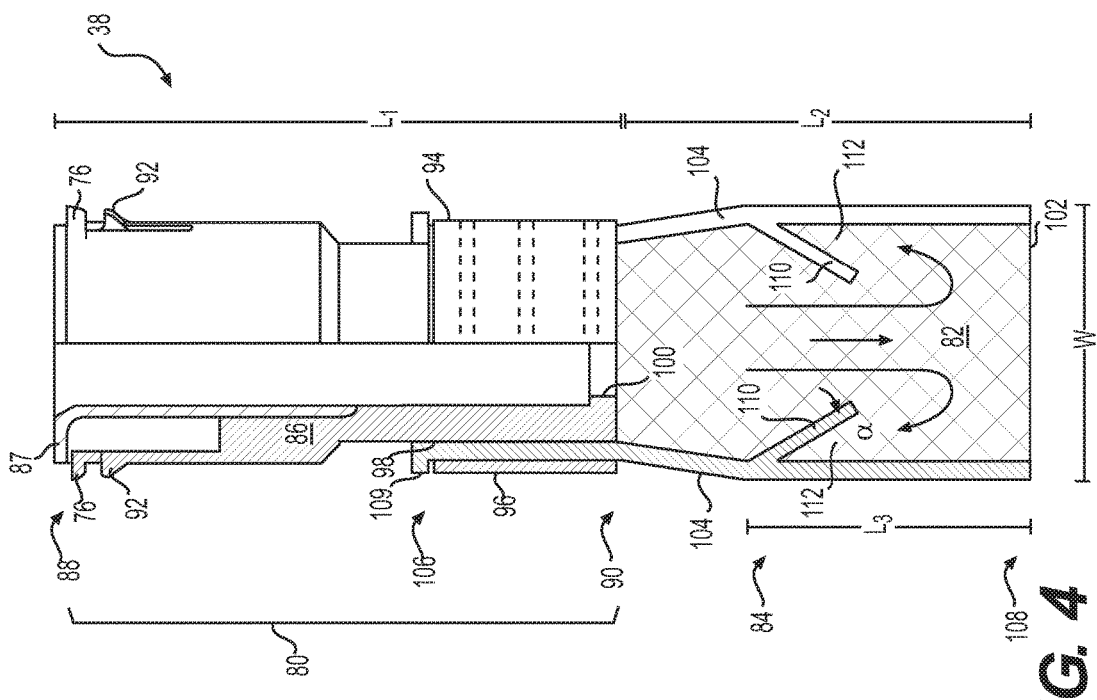

FLUID RESERVOIR HAVING INLET FILTERING

CROSS-REFERENCE TO RELATED APPLICATIONS

The present application claims the benefit of U.S. Provisional Application Ser. No. 62/165,012, filed May 21, 2015, which is fully incorporated herein.

TECHNICAL FIELD

This disclosure relates generally to a fluid reservoir and, more particularly, to a fluid reservoir having inlet filtering.

BACKGROUND

Selective Catalytic Reduction (SCR) is a known method for abating nitrogen oxides ($NO_x$) in the exhaust produced by a diesel engine. In a typical SCR system, a reductant is delivered directly into the exhaust by a pump and a specialized injector, and mixed with the exhaust before being directed through a catalyst. The reductant breaks down in the exhaust and reacts with nitrogen oxides ($NO_x$) at the catalyst to produce nitrogen gas ($N_2$) and water ($H_2O$), both of which are unregulated substances.

A supply of reductant is stored in a tank near the diesel engine in most mobile applications. The tank has a finite capacity and must be replenished periodically. In certain applications, such as in mining, construction, farming and other field applications, reductant replenishment is often carried out in the work environment of the associated machine by dispensing the reductant through an uncapped fill spout. As can be appreciated, dirt and other debris can fall into the tank when the fill spout is uncapped. This dirt and debris may present problems if it is ingested into downstream components (e.g., into the pump or the injector). Specifically, these components typically have close clearances and small orifices that can bind or become plugged by the dirt and debris.

Various solutions have been proposed to mitigate the presence of dirt and debris within a reductant tank. These solutions propose adding filtering media to a fill opening of the tank, or adding in-line filters at a location downstream of the tank and upstream of the reductant pump and injector. Although acceptable for some applications, conventional filtering media disposed at the inlet of the tank can impede rapid filling of the tank, which can decrease the associated machine's time in service. In addition, the reductant is susceptible to crystallization at high-temperatures and freezing at low-temperatures, which makes in-line filters prone to blockage.

The disclosed fluid reservoir and inlet filter are directed to overcoming one or more of the problems set forth above and/or other problems of the prior art.

SUMMARY

In one aspect, the present disclosure is directed to an inlet filter for use with a reductant tank having a fill spout. The inlet filter may include a generally cylindrical base portion having an open top end and an open bottom end and being configured for mounting inside the fill spout. The inlet filter may also include a mesh bag having a top connected to the generally cylindrical base portion, a folded bottom, and open side edges. The inlet filter may further include a bag carrier configured to close the open side edges.

In another aspect, the present disclosure is directed to a reductant reservoir assembly. The reductant reservoir assembly may include a reservoir having a fill spout and an inlet filter. The inlet filter may include a generally cylindrical base portion disposed inside the fill spout, and a mesh bag disposed inside the reservoir and connected to the generally cylindrical base portion. The mesh bag may have a folded bottom and open side edges. The inlet filter may further include a bag carrier configured to close the open side edges. The reductant reservoir assembly may additionally include an adapter disposed inside the fill spout and configured to connect the inlet filter to the reservoir, and a cap configured to engage the adapter and close off the fill spout.

In yet another aspect, the present disclosure is directed to a method of filtering reductant. The method may include receiving reductant through a bag-type filter located in a fill spout of a reservoir, and drawing the reductant from the reservoir through a primary in-tank filter and a secondary in-tank filter. The method may also include drawing reductant from the secondary in-tank filter through a pump inlet filter, pushing reductant through a pump outlet filter, and directing the reductant from the pump outlet filter to an injector.

BRIEF DESCRIPTION OF THE DRAWINGS

FIG. 4 is a cut-away view illustration of an exemplary disclosed inlet filter that may be used in conjunction with the reductant reservoir of FIG. 3; and FIG. 5 is an isometric illustration of the inlet filter of FIG. 4 during operation.

DETAILED DESCRIPTION

Figure 1:
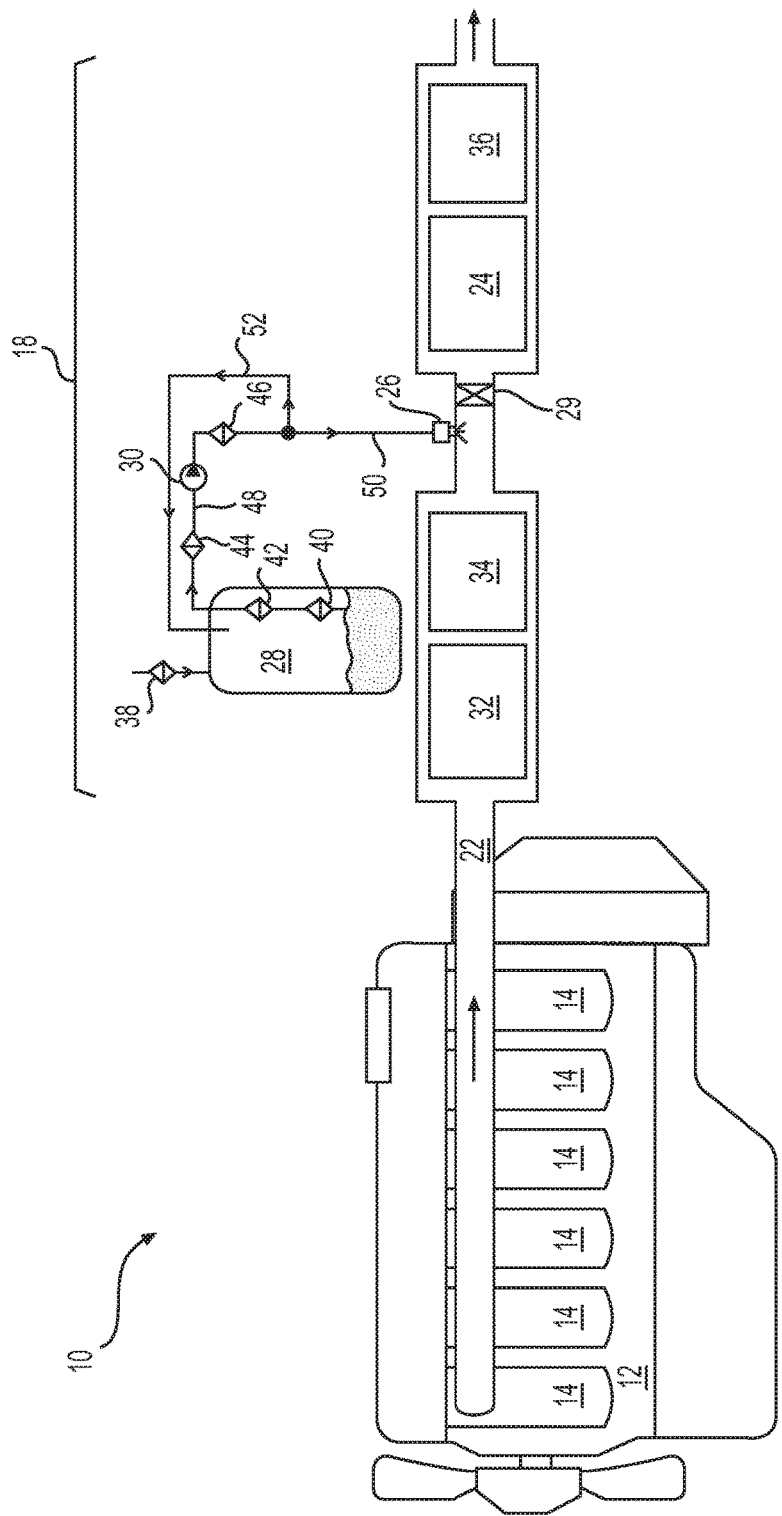
FIG. 1 is a diagrammatic illustration of an exemplary disclosed engine.

FIG. 1 illustrates an exemplary engine 10. For the purposes of this disclosure, engine 10 is depicted and described as a diesel-fueled, internal combustion engine. However, it is contemplated that engine 10 may embody any other type of combustion engine such as, for example, a gasoline engine or a gaseous fuel-powered engine burning compressed or liquefied natural gas, propane, or methane. Engine 10 may include an engine block 12 at least partially defining a plurality of cylinders 14, and a plurality of piston assemblies (not shown) disposed within cylinders 14 to form a plurality of combustion chambers (not shown). It is contemplated that engine 10 may include any number of combustion chambers and that the combustion chambers may be disposed in an in-line configuration (shown), in a "V" configuration, in an opposing-piston configuration, or in any other conventional configuration.

Multiple separate sub-systems may be associated within engine 10 and cooperate to facilitate the production of power. For example, engine 10 may include, among others an aftertreatment system 18. Engine 10 may combust an air and fuel mixture to produce mechanical power and a flow of exhaust gases. Aftertreatment system 18 may function to reduce the discharge of regulated exhaust constituents produced by engine 10 to the atmosphere.

Aftertreatment system 18 may include components configured to trap, catalyze, reduce, or otherwise remove regulated constituents from the exhaust flow of engine 10 prior to discharge to the atmosphere. For example, aftertreatment system 18 may include, among other things, one or more exhaust passages 22 in communication with the combustion chambers of engine 10, and one or more reduction catalysts 24 disposed within each passage 22 downstream of an associated injector 26. With this arrangement, a gaseous or liquid reductant, most commonly urea (($NH_2$)$_2$CO), a water/urea mixture, a hydrocarbon such as diesel fuel, or ammonia gas ($NH_3$), may be sprayed or otherwise advanced into the exhaust flow of passage 22 at a location upstream of reduction catalyst(s) 24 by reductant injector 26. If more than one reduction catalyst 24 is included, reduction catalysts 24 may be a arranged into bricks or packs, which are placed in parallel and/or series relative to the flow of exhaust. Many different configurations may be possible. To promote mixing of reductant with exhaust in some embodiments, a mixer 29 may be disposed within passage 22 at a location between reduction catalyst 24 and injector 26.

To facilitate dosing of reduction catalyst(s) 24 by reductant injector 26, an onboard reservoir 28 of reductant and a pressurizing device (e.g., a pump) 30 may be associated with reductant injector 26. In some embodiments, a single reservoir 28 and/or a single pump 30 may be associated with multiple injectors 26. In the disclosed embodiment, however, a single injector 26 is shown as being provided with reductant from a dedicated reservoir 28 and a dedicated pump 30. The reductant sprayed into passage 22 by injector 26 may flow downstream with the exhaust from engine 10 and be adsorbed onto an upstream surface of reduction catalyst(s) 24, where the reductant may react with $NO_X$ (NO and $NO_2$) in the exhaust gas to form water ($H_2O$) and elemental nitrogen ($N_2$), both of which may be unregulated. This process performed by reduction catalyst(s) 24 may be most effective when a concentration of NO to $NO_2$ supplied to substrate(s) 24 is about 1:1.

To help provide the correct ratio of NO to $NO_2$, an oxidation catalyst 32 may be located upstream of substrate (s) 24 and injector 26, in some embodiments. Oxidation catalyst 32 may be, for example, a diesel oxidation catalyst (DOC). As a DOC, oxidation catalyst 32 may include a porous ceramic honeycomb structure or a metal mesh substrate coated with a specialized material, for example a precious metal, which catalyzes a chemical reaction to alter the composition of the exhaust. For instance, oxidation catalyst 32 may include a washcoat of palladium, platinum, vanadium, or a mixture thereof that facilitates the conversion of NO to $NO_2$.

In one embodiment, oxidation catalyst 32 may also perform particulate trapping functions. That is, oxidation catalyst 32 may be a catalyzed particulate trap such as a continuously regenerating particulate trap or a catalyzed continuously regenerating particulate trap. As a particulate trap, oxidation catalyst 32 may function to trap or collect particulate matter. In other embodiments, however, an additional particulate trap 34 may be included in aftertreatment system 18 and located upstream or downstream of oxidation catalyst 32.

During operation of engine 10, it may be possible for too much ammonia gas to be advanced into the exhaust (i.e., ammonia gas in excess of that required for appropriate $NO_X$ reduction) by aftertreatment system 18. In this situation, known as "ammonia slip", some amount of ammonia may pass through reduction catalyst(s) 24 to the atmosphere, if not otherwise accounted for. To help reduce the magnitude of ammonia slip, an ammonia oxidation catalyst (AMO$_X$) 36 may be located downstream of reduction catalyst 24. Ammonia oxidation catalyst 36 may include a substrate coated with a catalyst that oxidizes residual $NH_3$ in the exhaust. It is contemplated that ammonia oxidation catalyst 36 may be omitted, if desired.

One or more different filters may be used to remove debris from the reductant prior to discharge into passage 22 to help ensure proper operation of the other components of aftertreatment system 18. In the disclosed embodiment, multiple filters are utilized and located at different stages of reductant delivery. These filters may include any combination of a tank inlet filter 38, a primary in-tank filter 40, a secondary in-tank filter 42, a pump inlet filter 44, and a pump outlet filter 46. It should be noted that, although inlet filter 38 is shown as being external to reservoir 28 in FIG. 1, it is contemplated that inlet filter 38 could alternatively be housed completely or partially inside reservoir 28 (see FIG. 3). Primary and secondary in-tank filters 40, 42 may be located inside reservoir 28 and downstream of tank inlet filter 38, while pump inlet and/or outlet filters 44, 46 may be located outside of reservoir 28 and downstream of primary and secondary in-tank filters 40, 42. In one embodiment, pump inlet and outlet filters 44, 46 are integral to pump 30 (i.e., come packaged together with pump 30). Pump 30 may draw reductant through filters 40-44 via a suction passage 48, and push the reductant through filter 46 to injector 26 via a supply passage 50. A return passage 52 may allow excess reductant to be redirected from supply passage 50 at a point downstream of filter 46 back to reservoir 28.

Many different types of filters may provide the functionality of filters 40-46. In one example, tank inlet filter 38 has a porosity of about 100-250 μm and an open area of about 45-50% (e.g., about 180 with about 48% open area); primary tank filter 42 has a porosity of about 5-10 μm; secondary tank filter 44 has a porosity of about 90-100 μm; inlet pump filter 44 has a porosity of about 90-100 μm; and outlet pump filter 46 has a porosity of about 10 Tank inlet filter 38 may be used to remove large debris from reductant entering reservoir 28 during a filling event and/or during operation of engine 10. Primary tank filter 42 may be used to filter finer debris that passes through tank inlet filter 38 before the reductant from reservoir 28 is provided to pump 30. In one embodiment, primary tank filter 42 may also enclose other components, such as secondary tank filter 44, an inlet for suction passage 48, a heater, a level sensor, and other components that may be sensitive to debris contamination. Secondary tank filter 44 may be a screen, which prevents ice particles of filtered reductant from entering and plugging suction passage 48 before the reductant in reservoir 28 has fully thawed during cold operating conditions. Pump inlet filter 44 may prevent debris present in suction passage 48 before and/or after assembly of aftertreatment system 18 from entering pump 30, and may further prevent entry of ice formed in suction passage 48 from plugging the working portions of pump 30. Pump outlet filter 46 may be configured to filter the main reductant outlet supply of pump 30.

Figure 2:
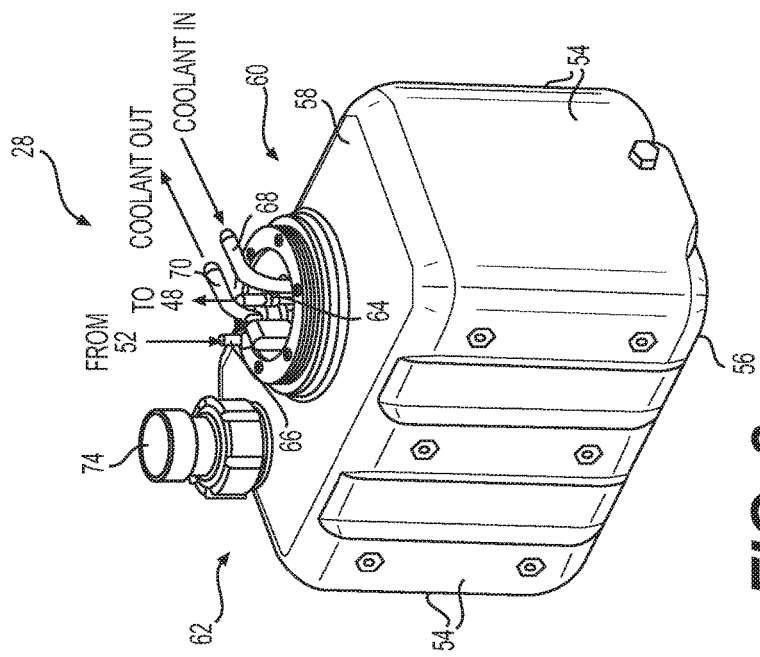
FIG. 2 is an isometric illustration of an exemplary disclosed reductant reservoir that may be used in conjunction with the engine of FIG. 1.

An exemplary physical embodiment of reservoir 28 is illustrated in FIG. 2. As shown in this figure, reservoir 28 may be rotationally molded (i.e., roto-molded) from a high-density polyethylene plastic material to form a generally hollow vessel. Reservoir 28 may include four side walls 54, a lower wall 56, and an upper wall 58 that together substantially enclose a volume configured to hold reductant (or another fluid). Although shown as having a generally cubic shape with flat walls, it is contemplated that reservoir 28 could have another shape, if desired.

Upper wall 58 may be provided with features that allow reductant into and out of reservoir 28. These features may include, among other things, a header 60 and a fill spout 62. Header 60 may be removably connectable to upper wall 58 (e.g., by way of threaded fastening and seals), and house a reductant suction port 64 associated with suction passage 48, and a reductant return port 66 associated with return passage 52. In some embodiments, header 60 may also house a coolant inlet port 68 and a coolant outlet port 70, both of which are connectable to a reductant heater located inside reservoir 28. Fill spout 62 may be a cylindrical opening that is integral with reservoir 28 and used for accessing the hollow interior therein.

Figure 3:
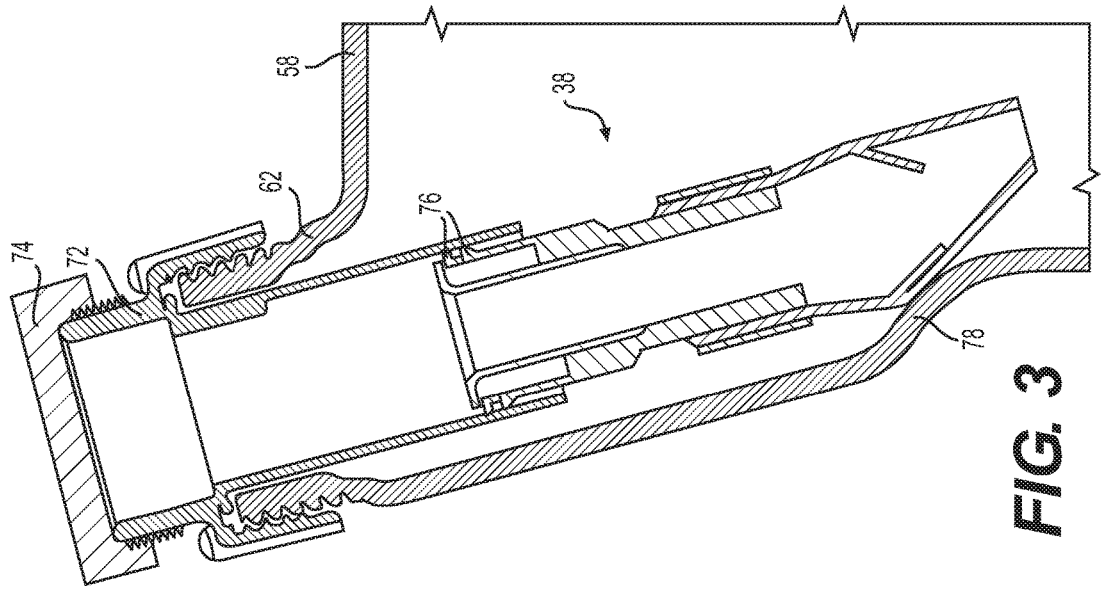
FIG. 3 is a cross-sectional illustration of an exemplary disclosed portion of the reductant reservoir of FIG. 2.

As shown in the enlarged cross-section of FIG. 3, tank inlet filter 38 may be at least partially disposed inside fill spout 62. In one example, an adapter 72 is used to connect tank inlet filter 38 to fill spout 62. Specifically, adapter 72 may be generally cylindrical, having an internal end receivable inside fill spout 62 and that also internally receives tank inlet filter 38, and an external end that threadingly connects to an outer annular surface of fill spout 62. A cap 74 may engage the external end of adapter 72 to close off fill spout 62. In another example (not shown), tank inlet filter 38 is directly assembled into fill spout 62 without the use of adapter 72. In either configuration, one or more outwardly extending tabs 76 may be located within corresponding grooves (e.g., within axial grooves formed within an internal annular surface of adapter 72 or fill spout 62) and used as an index to rotationally orient tank inlet filter 38 in a particular way with respect to any bends 78 that might exist in fill spout 62. This orientating of tank inlet filter 38 will be explained in more detail below.

As shown in FIG. 4, tank inlet filter 38 may be a bag type filter having a base portion 80 receivable by adapter 72 (referring to FIG. 3) and/or spout 62, a bag portion 82 connected to an internal end of base portion 80, and a bag carrier 84 connected to one or both of base portion 80 and bag portion 82 and used to help maintain a desired shape of bag portion 82 (i.e., to inhibit collapse during service). It is contemplated that bag carrier 84 could be omitted in some embodiments, if desired.

Base portion 80 may itself be an assembly of different components. These components may include, among other things, an outer cylindrical structure 86 having an open top end 88 and an open bottom end 90, and a nozzle insert 87 mounted inside structure 86 at top end 88. Nozzle insert 87 may be configured to provide geometry that guides and otherwise interacts with a reductant nozzle (not shown) during filling of reservoir 28, while also sealing off elements (e.g., an imbedded magnetic ring—not shown) of structure 86 that should not be exposed to the reductant. It is contemplated that insert 87 could have one or more indexing tabs (not shown) in addition to (e.g., that reinforce) or that function in place of tabs 76 described above, as desired.

An outer annular surface at top end 88 may include one or more connection features 92 (e.g., tangs that flex inward), which engage corresponding features (e.g., recesses or detents) in fill spout 62 when base portion 80 is pushed into fill spout 62, such that unintentional removal of inlet filter 38 is inhibited. Bottom end 90 of structure 86 may neck down to a smaller outer diameter than top end 88 such that, after connection of bag portion 82 and bag carrier 84 to bottom end 90, the combined outer diameters at bottom end 90 are about the same as or less than the outer diameter at top end 88. This diametrical relationship may ease assembly of inlet filter 38 into adapter 72 and/or fill spout 62.

In some embodiment, the outer annular surface at bottom end 90 may include protrusions (e.g., barbs, teeth, spikes, etc.) 94 that facilitate retention of bag portion 82. Specifically, as bag portion 82 is slipped over bottom end 90, a retainer 96 (e.g., a flexible band or shrink-wrap adhesive) that exerts an inward pressure may be located around bag portion 82, causing bag portion 82 to fill in voids between protrusions 94. This arrangement may require shearing of bag portion 82 and/or protrusions 94 before bag portion 82 can be disassembled from bottom end 90 of structure 86 (i.e., without intentional removal of retainer 96). It is contemplated that protrusions 94 may be omitted, if desired.

Also in some embodiments, the outer annular surface at bottom end 90 may include axially oriented grooves or channels 98 that are configured to allow recessing of bag carrier 84. By recessing bag carrier 84 within structure 86, bag carrier 84 may be inhibited from fanning radially outward by excessive amounts that can make assembly into adapter 72 and/or fill spout 62 difficult. It is contemplated that grooves 98 may be omitted, if desired.

Finally, an inwardly protruding end stop 100 may be located at bottom end 90. End stop 100 may be configured to limit a penetration depth of the reductant nozzle, such that the reductant nozzle cannot come into damaging contact with bag portion 82. It is contemplated that end stop 100 may be omitted, if desired.

Bag portion 82 may be a mesh bag made from a synthetic fabric. In the disclosed embodiment, the synthetic fabric is polypropylene or nylon having the porosity and open area described above. The mesh bag may be formed by folding an elongated strip of the fabric over itself in a lengthwise direction, such that a fold 102 is located at a distal end of bag portion 82. The opposing open edges of the fabric may then be joined to each other, such that a bag-like enclosure is formed between the layers of fabric. In one example, the edges of the fabric are joined to each other and closed via adhesive and/or sewing. In another example, the edges of the fabric are joined to each other and closed via over-molding of bag carrier 84 onto the edges. It should be noted that a width W at fold 102 of bag portion 82 may be larger than an outer diameter of bottom end 90 of structure 86. This may require the edges of bag portion 82 to be squeezed towards each other somewhat during assembly into adapter 72 and/or spout 62, causing the fabric bag to expand outward at locations between the edges (i.e., for the fabric bag to morph from a wedge cross-sectional shape to a more rounded shape).

Bag carrier 84 may provide a robust mechanism for closing the edges of bag portion 82. In the disclosed embodiment, bag carrier 84 includes two legs 104 that are located at opposing edges of bag portion 82 and that extend from bottom end 90 of structure 86 to fold 102. Legs 104 may be molded over the fabric edges of bag portion 82, such that the fabric is located between two adhered layers of carrier material. Legs 104 may be molded from a synthetic material such as Acetal or non-glass reinforced nylon.

Each leg 104 may have a top end 106 and a bottom end 108. A protrusion 109 may be formed at top end 106 to inhibit leg 104 from being pulled downward from under retainer 96 in an axial direction out of groove 98. An inwardly protruding arm 110 may branch away from each leg 104 and extend a distance towards a center axis of bag portion 82. Each arm 110, together with a corresponding leg 104, may form a wedge-shaped pocket 112 that functions to trap lighter debris particles in the reductant flow as they churn outward and upward (see arrows) during filling of reservoir 28. By trapping the lighter debris particles within pocket 112, the main flow area through the center of bag portion 82 may be kept relatively free and unrestricted. A less-restricted flow area may allow for higher flow rates.

The disclosed tank inlet filter 38 may have dimensional relationships that allow it to achieve required flow-rate specifications, filtration specifications, nozzle specifications, reservoir specifications, and/or other specifications. In particular, base portion 80 may have a length $L_1$; bag portion 82 may have a length $L_2$; and each arm 110 may branch away from its paired leg 104 at a distance $L_3$ away from fold 102. In addition, an interior angle $\alpha$ may be formed between arm 110 and its corresponding leg 104. In the disclosed embodiment, $L_1$ may be about equal to $L_2$ (e.g., with about 90-100%). $L_3$ may be about equal to 50-60% of $L_1$ or about 25-30% of an overall length of tank inlet filter 38 (i.e., $L_1$ may be about equal to $L_2+L_3$). W may be about equal to 60-80% of $L_2$. $\alpha$ may be about equal to 55-65°. With this configuration, reservoir 28 may be filled at a rate of about 20-40 liters per minute.

FIG. 5 illustrates tank inlet filter 38 during operation. FIG. 5 will be discussed in more detail in the following section.

INDUSTRIAL APPLICABILITY

The present disclosure is applicable to aftertreatment systems for diesel engines and, more particularly, to aftertreatment systems using SCR processes requiring the injection of urea-based water solutions into engine exhaust streams. In the disclosed embodiments, a multi-stage arrangement is disclosed for filtering a feed of reductant to an injector. This arrangement may be advantageously configured to provide protection from debris, such as silt, dirt, fibers and the like, and also from transient debris such as ice, from entering into and/or otherwise clogging reductant flow passages and associated components. The disclosed tank inlet filter provides a first stage of this filtering.

Tank inlet filter 38 may be assembled into adapter 72 and/or fill spout 62 in a particular rotational orientation that facilitates desired filling and filtering performance. In particular, it has been discovered that when the bag of a bag-type filter lays against a wall of an associated passage or tank, the portion of the bag in contact with the wall becomes ineffective. That is, the contacting portion of the bag may no longer pass reductant, as it is being blocked by the wall. This may greatly reduce a fill rate of the filter. Accordingly, the bag should be inhibited from wall contact as much as possible.

For each reservoir and/or fill spout configuration, the location of potential bag-contact areas should be known. For example, as shown in FIG. 3, there is a high likelihood that bag portion 82 could contact the interior walls of fill spout 62 at bend 78. This knowledge may be obtained through comparison of reservoir and filter geometries. However, if tank inlet filter 38 is oriented such that at least one leg 104 is located against the inwardly protruding wall at bend 78 (shown), the fabric of bag portion 82 may be kept from lying against the wall. Accordingly, the orientation of tabs 76 (referring to FIG. 4) relative to legs 104 should be known and indexed within adapter 72 and/or fill spout 62, in order to ensure that leg 104 is rotated to the desired location against the wall.

Figure 6:
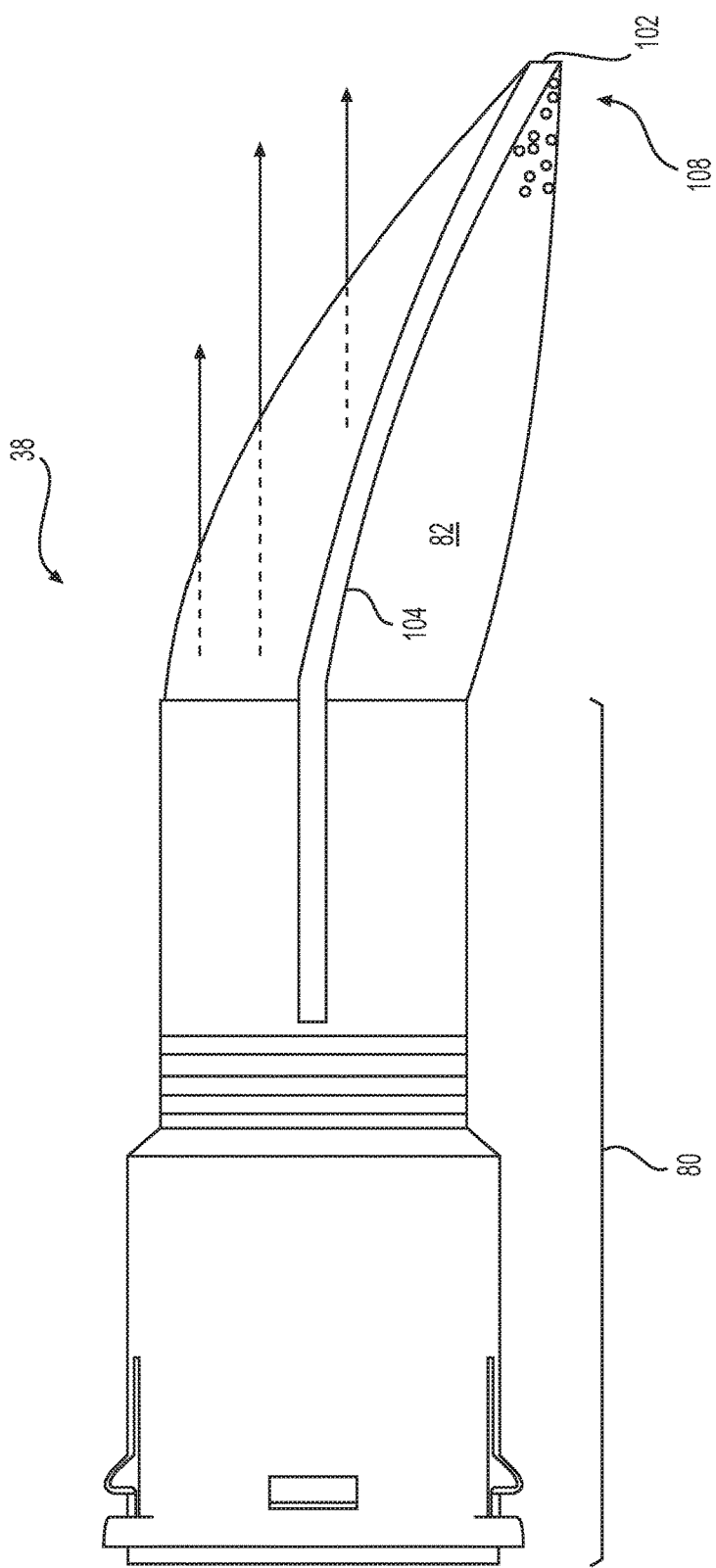
FIG. 6 is a cross section illustration of an exemplary disclosed portion of the reductant reservoir.

In other embodiments, the rotational orientation of tank inlet filter 38 may be controlled to improve fill and/or filtration performance, even when contact between bag portion 82 and a wall is unlikely. Specifically, as shown in FIG. 5, legs 104 may be flexible enough to allow bag portion 82 to sag under the pull of gravity when tank inlet filter 38 is assembled in a non-vertical direction. That is, as tank inlet filter 38 is tilted away from vertical, legs 104 may flex downward some to allow sagging of end 108 away from a center axis of tank inlet filter 38. When this happens, a high-pressure flow of reductant (represented by the arrows in FIG. 5) may remain generally oriented along the center axis of tank inlet filter 38 and pass primarily out through a side of bag portion 82 instead of through fold 102 at bottom end 108, as generally seen in FIG. 6. At this time, any debris that has collected within bag portion 82 may fall down toward fold 102 and out of the way of the reductant flow. This may leave the reductant flow substantially unrestricted, allowing for a higher-fill rate.

It will be apparent to those skilled in the art that various modifications and variations can be made to the fluid reservoir and inlet filter of the present disclosure without departing from the scope of the disclosure. Other embodiments will be apparent to those skilled in the art from consideration of the specification and practice of the fluid reservoir and inlet filter. It is intended that the specification and examples be considered as exemplary only, with a true scope of the disclosure being indicated by the following claims and their equivalents.

What is claimed is:

1. An inlet filter for a reductant tank having a fill spout, comprising:
   a generally cylindrical base portion having an open top end and an open bottom end and mountable inside the fill spout;
   a mesh bag having a top connected to the generally cylindrical base portion, a folded flat bottom, and open side edges at opposing edges of the mesh bag; and
   a bag carrier that closes the open side edges of the mesh bag,
   wherein the bag carrier includes a pair of flexible legs that form external walls of the air inlet filter, one flexible leg of the pair located at each of the opposing side edges of the mesh bag and closing the opposing edges of the mesh bag so as to form one of the external walls of the air inlet filter,
   wherein each of the flexible legs extends longitudinally from the open bottom end of the base portion, away from the open top end of the base portion,
   wherein each of the flexible legs is visible in a side elevational view of the inlet filter, and
   wherein each of the flexible legs has an inwardly projecting arm that projects inwardly and away from the generally cylindrical base portion to form a wedge-shaped pocket.

2. The inlet filter of claim 1, wherein the bag carrier is molded over the open side edges of the mesh bag.

3. The inlet filter of claim 1, wherein the open bottom end of the generally cylindrical base portion includes an axially oriented groove configured to receive each leg.

4. The inlet filter of claim 1, wherein the generally cylindrical base portion includes:
   an outer cylindrical structure; and
   a nozzle insert mounted inside the outer cylindrical structure.

5. The inlet filter of claim 4, wherein at least one of the outer cylindrical structure and the nozzle insert includes a tab indexed to a location of the leg.

6. The inlet filter of claim 1, wherein the mesh bag is fabricated from a synthetic fabric having a porosity of about 100-250 μm.

7. The inlet filter of claim 6, wherein the mesh bag has an open area of about 45-50%.

8. The inlet filter of claim 1, further including a flexible retainer to exert an inward pressure on the mesh bag at the open bottom end of the generally cylindrical base portion.

9. The inlet filter of claim 8, wherein the generally cylindrical base portion includes protrusions at the open bottom end to facilitate retention of the mesh bag.

10. The inlet filter of claim 1, wherein the mesh bag has a length about equal to a length of the generally cylindrical base portion.

11. The inlet filter of claim 10, wherein the mesh bag has a width about equal to 50% of its length.

12. A reductant reservoir assembly, comprising:
a reservoir having a fill spout;
an inlet filter including:
a generally cylindrical base portion disposed inside the fill spout;
a mesh bag disposed inside the reservoir and being connected to the generally cylindrical base portion, the mesh bag having a folded bottom, and open side edges at opposing edges of the mesh bag; and
a bag carrier that closes the open side edges of the mesh bag;
an adapter disposed inside the fill spout to connect the inlet filter to the fill spout; and
a cap to engage the adapter and close off the fill spout,
wherein the bag carrier includes a pair of flexible legs that form external walls of the air inlet filter, one flexible leg of the pair located at each of the opposing side edges of the mesh bag and closing the opposing edges of the mesh bag so as to form one of the external walls of the air inlet filter,
wherein each of the flexible legs extends longitudinally from the open bottom end of the base portion, away from the open top end of the base portion, and
wherein each of the flexible legs has an inwardly projecting arm that projects inwardly and away from the generally cylindrical base portion.

13. The reductant reservoir assembly of claim 12, wherein the generally cylindrical base portion includes an axially oriented groove to receive each leg.

14. The reductant reservoir assembly of claim 13, wherein the generally cylindrical base portion includes a tab indexed to a location of the leg.

15. The reductant reservoir assembly of claim 12, wherein the mesh bag is fabricated from a synthetic fabric having a porosity of about 100-250 μm.

16. The reductant reservoir assembly of claim 15, wherein the mesh bag has an open area of about 45-50%.

17. The reductant reservoir assembly of claim 12, wherein the inlet filter further includes a flexible retainer to exert an inward pressure on the mesh bag at an open bottom end of the generally cylindrical base portion.

18. A method of filtering reductant, comprising:
receiving reductant through a filter located in a fill spout of a reservoir;
drawing the reductant from the reservoir through a primary in-tank filter and a secondary in-tank filter;
drawing reductant from the secondary in-tank filter through a pump inlet filter;
pushing reductant through a pump outlet filter; and
directing the reductant from the pump outlet filter to an injector,
wherein the filter includes:
a generally cylindrical base portion having an open top end and an open bottom end and mountable inside the fill spout;
a mesh bag having a top connected to the generally cylindrical base portion, a folded flat bottom, and open side edges at opposing edges of the mesh bag; and
a bag carrier that closes the open side edges of the mesh bag,
wherein the bag carrier includes a pair of flexible legs that form external walls of the air inlet filter, one flexible leg of the pair located at each of the opposing side edges of the mesh bag and closing the opposing edges of the mesh bag so as to form one of the external walls of the air inlet filter,
wherein each of the flexible legs extends longitudinally from the open bottom end of the base portion, away from the open top end of the base portion, and
wherein each of the flexible legs has an inwardly projecting arm that projects inwardly and away from the generally cylindrical base portion to form a wedge-shaped pocket.

* * * * *